United States Patent [19]
Caron et al.

[11] Patent Number: 5,400,639
[45] Date of Patent: Mar. 28, 1995

[54] CARRIER FOR MASS AIR FLOW PRODUCTION LINE

[75] Inventors: Richard W. Caron, Canton; Richard T. Munie, Dearborn Heights, both of Mich.; Dean C. Newswanger, Lebanon, Pa.

[73] Assignee: Ford Motor Company, Dearborn, Mich.

[21] Appl. No.: 210,105

[22] Filed: Mar. 16, 1994

Related U.S. Application Data

[63] Continuation of Ser. No. 941,300, Sep. 4, 1992, abandoned.

[51] Int. Cl.⁶ .............................. G01F 25/00
[52] U.S. Cl. .................................. 73/3
[58] Field of Search ............ 73/118.1, 118.2, 3, 73/204.22, 273; 209/573, 574; 224/242, 245; 248/542, 682, 146, 176, 346

[56] References Cited

U.S. PATENT DOCUMENTS

| | | | |
|---|---|---|---|
| 3,817,082 | 6/1974 | Fletcher et al. | 73/3 |
| 4,264,961 | 4/1981 | Nishimura et al. | 73/3 |
| 4,566,307 | 1/1986 | Boykin | 73/3 |
| 4,578,996 | 4/1986 | Abe et al. | 73/118.2 |
| 4,620,440 | 11/1986 | Thompson | 73/118.1 |
| 4,823,462 | 4/1989 | Huber | 73/118.2 |
| 4,974,445 | 12/1990 | Arai et al. | 73/118.2 |
| 4,986,123 | 1/1991 | Losing et al. | 73/204.26 |
| 5,186,044 | 2/1993 | Igarashi et al. | 73/118.2 |

FOREIGN PATENT DOCUMENTS

| | | | |
|---|---|---|---|
| 0175918 | 10/1982 | Japan | 73/118.2 |
| 0210714 | 9/1988 | Japan | 73/118.2 |
| 3261825 | 11/1991 | Japan | 73/118.2 |

*Primary Examiner*—Robert Raevis
*Attorney, Agent, or Firm*—Roger L. May; Peter Abolins

[57] ABSTRACT

A carrier for the assembly, test and calibration of a mass air flow sensor on a production line. The support carrier consists of a structure having a well for receiving a first portion of the sensor head of the mass air flow sensor and a transverse air flow passage provided through the support structure aligned with the well and parallel to the top surface of the support structure. A clearance aperture connects the bottom of the well with an air flow passage and permits the sensor elements of the mass air flow sensor to be centrally disposed in the air flow passage. Sealing surfaces provided at the opposite ends of the air flow passage permit the carrier to be connected to a controlled source of air. Locating pins align the mass air flow sensor on the carrier with the sensor elements accurately positioned in the air flow passage.

9 Claims, 2 Drawing Sheets

CARRIER FOR MASS AIR FLOW PRODUCTION LINE

This is a continuation of application Ser. No. 07/941,300, filed on Sep. 4, 1992, now abandoned.

TECHNICAL FIELD

The invention is related to carriers which support devices on production lines and in particular to a carrier for the assembly, test and calibration of mass air flow sensors on a production line.

BACKGROUND ART

Various types of carriers for the assembly, test and calibration of mass air flow sensors on automated production lines are known in the art. In general, the mass air flow sensor must be removed from the assembly carrier for test and calibration. Each time the mass air flow sensor is removed from the assembly carrier, there is a possibility that the sensor elements at the end of the sensor head may be damaged. Also, during the tests and calibration, the air flow profile of the different test and calibration stations are not only different from each other, but also may be different from the air flow profile which the mass air flow sensor is in actual use. As a result, the calibration of the mass air flow sensor is not as accurate as could be and often requires trimming and/or adjustment at the final installation in a control system, such as an electronic fuel control system for an internal combustion engine.

The invention is directed to a carrier which eliminated the removal of the mass air flow sensor for test and calibration and which provides an air flow profile during test and calibration which is repeatable and simulates the air flow profile the sensor will be exposed to in its ultimate application.

SUMMARY OF THE INVENTION

The invention is a carrier for the assembly, test and calibration of a mass air flow sensor which eliminates the requirement for the removal of the mass air flow sensor for test and calibration.

The carrier has the advantage that during assembly, test and calibration, the sensor head and the delicate sensor elements are completely enclosed significantly reducing the probability of accidental or inadvertent damage.

Another advantage of the carrier is that it embodies an air flow passage which closely simulates the air flow profile to which the sensor will be exposed in actual use and which allows the mass air flow sensor to be produced with a high degree of repeatability and accuracy.

Still another advantage is that the air flow passage embodied within the carrier assures repeatability of the air flow profile at each test and calibration station.

The carrier consists of a support structure having a top surface and at least two opposing side surfaces. A well provided in the top surface receives a first portion of the sensor head. The sensor's O-ring seal engages the bottom of the well to pneumatically seal the sensor head in the carrier. A transverse air flow passage is provided through the support structure parallel to the top surface. A clearance aperture connects the bottom of the well with the transverse air flow passage. The clearance aperture permits the sensor head to extend into the air flow passage. The distance between the top surface of the support structure and the air flow passage is selected so that the sensor elements of the mass air flow sensor are centrally disposed within the air flow passage. Sealing surfaces are provided at the opposite ends of the air flow passage which permit the air flow passage to be connected to a controlled source of air. A pair of locating pins are provided on the top surface of the support structure which engage the mass air flow sensor and align the sensor head in the well and the sensor elements in the air flow passage. Preferably the sealing surfaces are recessed to reduce the probability of being damaged.

Other features and advantages of the carrier for the assembly, test and calibration of a mass air flow sensor on a production will become more apparent from reading the specification in conjunction with the drawings.

BEST MODE FOR CARRYING OUT THE INVENTION

Figure 1:
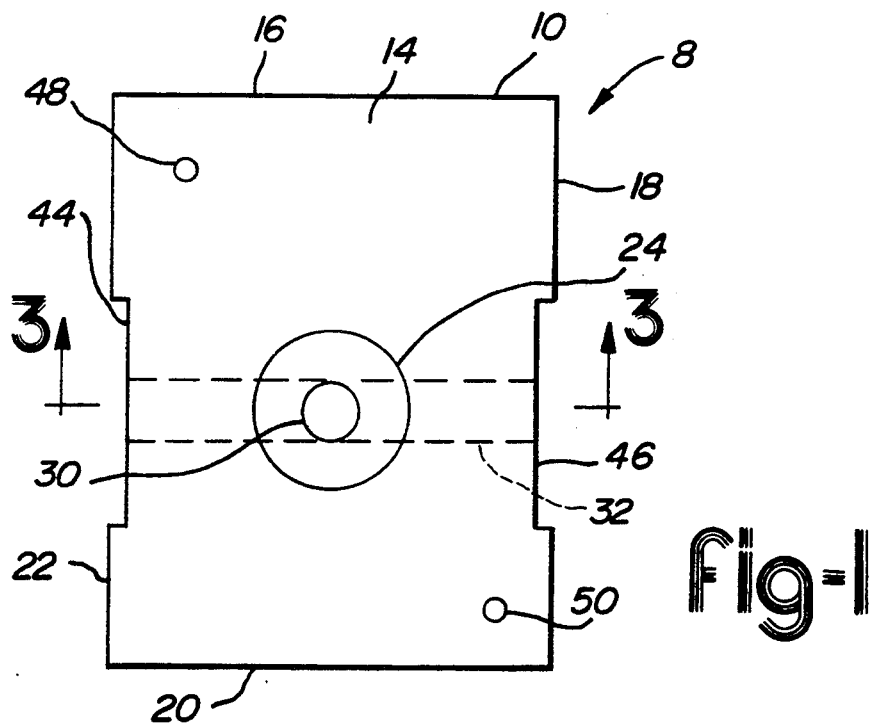
FIG. 1 is a top view of the carrier.
Figure 2:
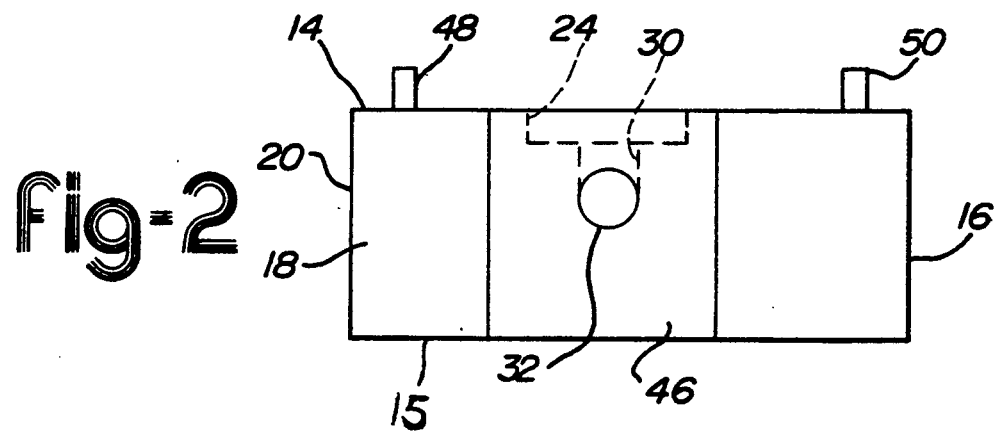
FIG. 2 is a side view of the carrier.
Figure 3:
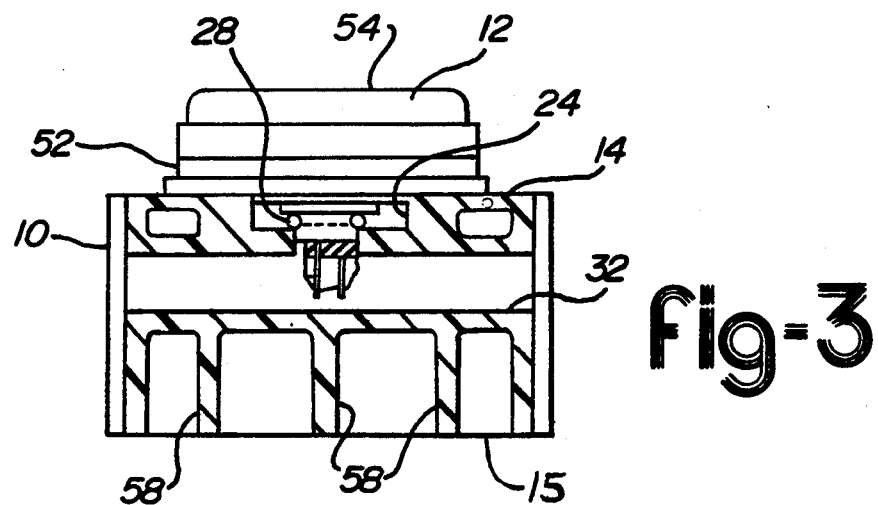
FIG. 3 is a cross-sectional side view of the carrier.
Figure 4:
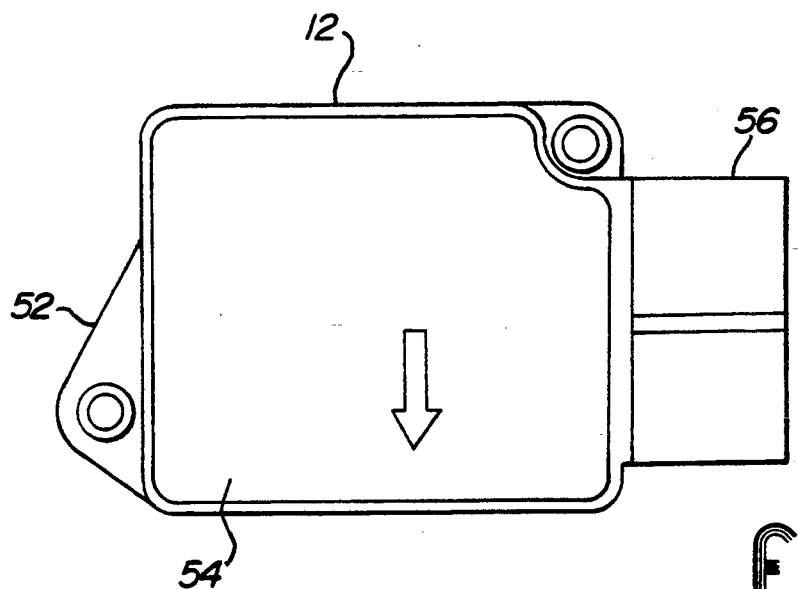
FIG. 4 is a top view of the mass air flow sensor.
Figure 5:
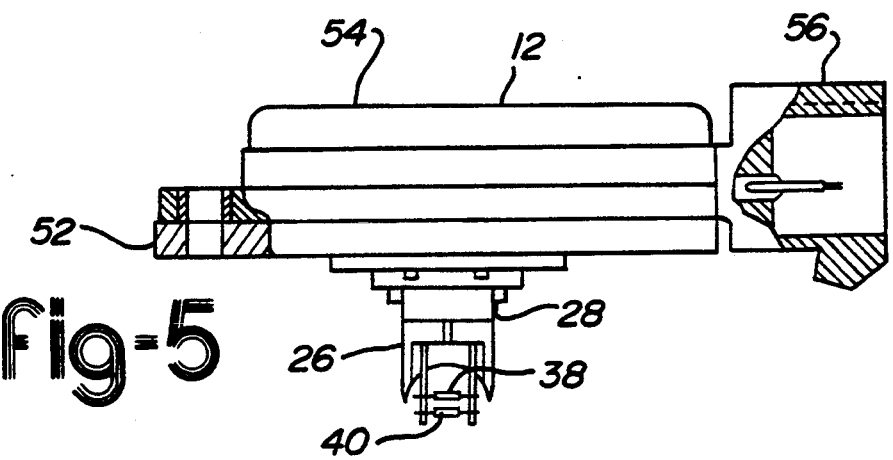
FIG. 5 is a side view of the mass air flow sensor.

FIGS. 1, 2 and 3 show the details of the production line carrier 8 for the assembly and test of a mass air flow sensor 12 of the type shown in FIGS. 4 and 5. The carrier 8 has a support structure 10 which has a flat top surface 14 a flat bottom surface 15 parallel to the top surface 14 and four side surfaces 16, 18, 20 and 22. A well 24 is provided in the top surface 14 of the support structure 10 to receive the sensor head 26 of the mass air flow sensor 12 as more clearly shown in FIG. 3. The depth of the bottom of the well 24 is selected to be sealingly engaged by the O-ring 28 circumscribing the sensor head 26. A bore or clearance aperture 30 is provided at the bottom of the well 24 which permits the sensor head 26 to extend into an air flow passage 32. The air flow passage 32 is spaced from the top surface 14 and passes through the support structure 10 parallel to sides 18 and 22 and has a diameter comparable to the diameter of air passage 34 of the sensor manifold 36 shown in FIG. 6.

Figure 6:
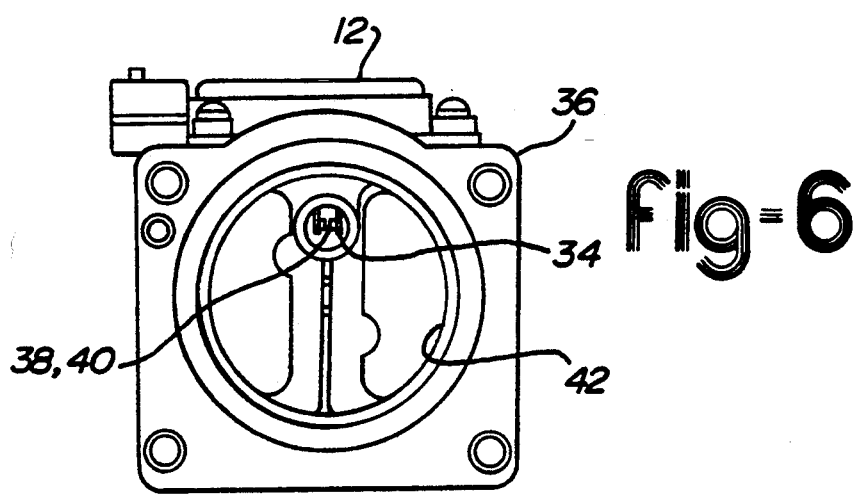
FIG. 6 is a front view showing the mass air flow sensor mounted to a sensor manifold.

As illustrated in FIG. 6, the mass air flow sensor 12 mounted on the sensor manifold 36 which is connectable to the engine's air intake manifold, not shown. The sensor elements 38 and 40 of the mass air flow sensor extend into the air passage 34 which is isolated from the main air flow passage 42. The air flow passage 32 of the carrier 8 simulates the air flow profile of the air passage 34 in the sensor manifold 36 during the testing and calibration of the mass air flow sensor during assembly.

As shown in FIGS. 1 through 3, the sides 18 and 22 have a rectangular shape and have recessed sealing surfaces 44 and 46 adjacent to the ends of the air flow passage 32. The recessed sealing surfaces are flat and sealingly receive the air connections provided at the various testing and calibration stations along the assembly line. These sealing surfaces 44 and 46 have a rectangular shape and are recessed to protect them from being accidentally scratched or otherwise damaged during handling.

A pair of locating pins 48 and 50 extend from the top surface 14 which accurately positions the mass air flow sensor's base 52 and superstructure 54 on the top surface 14 of the support structure 10. The superstructure 54 houses the mass air flow sensor's electronic circuit, not shown, and the electrical connector 56. As shown in FIG. 3, the support structure 10 may be a molded plastic structure which is substantially hollow having ribs 58, or other internal structural members to make it a structurally rigid element. Alternatively, the support structure may be molded as a solid element.

In the assembly of the mass air flow sensor 12, the base 52 and sensor head 26 are placed on the carrier 8 using the locating pins 48 and 50. This accurately locates these elements on the support structure 10. The carrier 8 is then placed on the assembly line where it is carried to various assembly, test and calibration stations as is known in the art. At each station, the carrier 8 with the mass air flow sensor 12 positioned thereon is lifted from the assembly line and located by the station's material handling system and the assembly, test or calibration is executed. At test and calibration stations which require an air flow, the carrier 8 and mass air flow sensor 12 is lifted from the station's lifting mechanism and a force is applied to the mass air flow sensor to compress the O-ring 28 and seal the mass air flow sensor at the bottom of the well 24 from atmospheric air flow. The station's air flow apparatus then engages the sealing surfaces 44 and 46 connecting the air flow passage 32 to an air supply providing the desired air flow rate through the air flow passage 32. The required tests or measurements are then made while the desired air flow rate is passing through the air flow passage.

Because the air flow passage 32 of the carrier 8 closely approximates the operating environment in an automotive vehicle, the calibration will accurately represent the air flow in the air intake manifold of the engine. The air flow passage 32 also eliminates the removal of the mass air flow sensor from the carrier for the tests and calibration operations requiring an air flow. This feature eliminates potential damage to the sensor head 26 and the sensor elements 38 and 40 which could otherwise occur during the removal and replacement of the mass air flow sensor on the carrier for these tests. Another feature is that the sensor head 26 and the sensing elements 38 and 40 are at all times located within the carrier 8 and shielded from being physically contacted or broken by accidental engagement with other objects, either in the assembly line or in an assembly, test or calibration work station. Another feature is that the mass air flow sensor is subjected to the same air flow profile at each test or calibration station requiring an air flow making the tests accurate and repeatable.

It is not intended that the carrier for the mass air flow sensor disclosed herein be limited to the specific mass air flow sensor and the carrier shown in the drawings and described in the specification. It is recognized that the carrier may be adapted to different types of air flow sensors and its structure may be changed to accommodate different types of tests and test station structures. All of these types of changes and/or modifications are contemplated to be within the scope of the invention as set forth in the appended claims.

We claim:

1. A carrier for the assembly, test and calibration of a mass air flow sensor having a base, a sensor head and an O-ring seal circumscribing said sensor head, and wherein said sensor head has at least one sensor element located at the end thereof, said carrier comprising:
   a sensor support structure having a substantially flat top surface, a substantially parallel bottom surface, and a pair of substantially parallel opposing side surfaces provided at opposite ends of said support structure;
   a sensor head well provided in said support structure normal to said top surface, said sensor head well having an axis of symmetry and a bottom surface compressively engageable by said O-ring seal;
   an air flow passage provided through said support structure intersecting said axis of symmetry, said air flow passage being parallel to said top surface and spaced a predetermined distance therefrom;
   a flat rectangularly-shaped sealing surface provided adjacent each end of said air flow passage;
   a bore concentric with said axis of symmetry provided through said bottom surface of said sensor head well connecting said sensor head well with said air flow passage, said bore permitting the extension of said sensor head into said air flow passage; and
   at least two locating pins engageable with said base of said air flow sensor to align said sensor head in said sensor head well.

2. The carrier of claim 1 wherein said pair of substantially parallel opposing side surfaces are disposed normal to said air flow passage.

3. The carrier of claim 2 wherein said sealing surfaces are rectangularly-shaped recessed portions of said opposing side surfaces.

4. The carrier of claim 1 wherein said predetermined distance said air flow passage is spaced from said top surface is selected to centrally locate at least one sensor element in said air flow channel when said base of said mass air flow sensor is engaged with said top surface.

5. A carrier for the assembly and test of a mass air flow sensor, the mass air flow sensor designed to be mounted on a sensor manifold having a main air flow passage and an isolated air flow passage, said carrier comprising:
   a support structure having a flat top surface, a flat bottom surface parallel to said top surface and at least two rectangularly-shaped side surfaces substantially parallel to each other, said side surfaces being provided at opposite ends of said support structure;
   a well provided in said top surface having an axis of symmetry, a predetermined diameter and a predetermined depth;
   an air flow channel provided through said support structure normal to said at least two sides, said air flow channel spaced a predetermined distance from said top surface, and intersecting said axis of symmetry;
   a clearance aperture concentric with said axis of symmetry connecting said well with said air flow passage, said clearance aperture having a diameter less than said predetermined diameter;
   a flat rectangularly-shaped sealing surface provided adjacent each end of said air flow channel permitting said air flow channel to be connected to an air flow source; and
   means for aligning said air flow sensor on said top surface relative to said well and clearance aperture.

6. The carrier of claim 5 wherein said flat sealing surfaces are recessed portions of said at least two side surfaces.

7. A carrier for the assembly, test and calibration of a mass air flow sensor having a sensor head supporting at least one sensor element at an end thereof, said carrier comprising:

- a sensor support structure having a rectangularly-shaped, substantially flat top surface and a substantially parallel rectangularly-shaped base surface, said support structure further having at least two substantially parallel rectangularly-shaped side surfaces disposed normal to said top surface at opposite ends of said support structure;
- a well provided in said top surface, said well dimensioned to receive a first portion of said sensor head, said well having an axis of symmetry normal to said top surface, said well further having a bottom surface substantially parallel to said top surface;
- a bore provided through said bottom surface of said well, concentric with said axis of symmetry, said bore extending a predetermined distance into said support structure and dimensioned to receive therein a second portion of said sensor head;
- a single transverse air flow passage extending through said support structure parallel to said top surface, said transverse air flow passage being disposed normal to said substantially parallel side surfaces and intersecting with said bore, said transverse air flow passage being located a distance from said bottom surface of said well selected to have said at least one sensor element centrally located within said transverse air flow passage;
- a recessed sealing surface provided in each of said side surfaces adjacent to each end of said transverse air flow passage; and
- at least two locating pins protruding from said top surface engageable with said mass air flow sensor to accurately located said sensor head relative to said well.

8. The carrier of claim 7 wherein said mass air flow sensor has an O-ring seal circumscribing said sensor and a base spanning said well, said well has a depth selected so that said O-ring compressively engages said bottom surface of said well when said base of said mass air flow sensor is engaged with said top surface.

9. The carrier of claim 8 wherein each of said recessed sealing surfaces are rectangular recessed portions of said side surfaces.

* * * * *